United States Patent [19]
Davidson

[11] 3,908,777
[45] Sept. 30, 1975

[54] GOLF CAR SUNTOP

[75] Inventor: William G. Davidson, Elm Grove, Wis.

[73] Assignee: AMF Incorporated, White Plains, N.Y.

[22] Filed: Nov. 4, 1974

[21] Appl. No.: 520,532

[52] U.S. Cl. ............ 180/69 C; 280/DIG. 5; 296/102
[51] Int. Cl.² .......................................... B62D 25/06
[58] Field of Search .............. 186/67 C, 69 R, 65 R; 280/DIG. 5, 150 C; 296/28 C, 102, 103, 105

[56] References Cited
UNITED STATES PATENTS

| | | |
|---|---|---|
| 2,911,232 | 11/1959 | Hastings, Jr. et al. ............... 296/102 |
| 2,973,048 | 2/1961 | Jensen ............................... 180/69 C |
| 3,671,071 | 6/1972 | Evinrude ....................... 280/DIG. 5 |
| 3,709,553 | 1/1973 | Churchill et al. .............. 280/DIG. 5 |
| 3,796,277 | 3/1974 | Gordon ............................. 180/69 R |

Primary Examiner—David Schonberg
Assistant Examiner—David M. Mitchell
Attorney, Agent, or Firm—George W. Price; Walter Lewis

[57] ABSTRACT

The suntop is mounted on the golf car so that the car body can be hinged open free and clear of the suntop.

1 Claim, 5 Drawing Figures

U.S. Patent  Sept. 30,1975  3,908,777
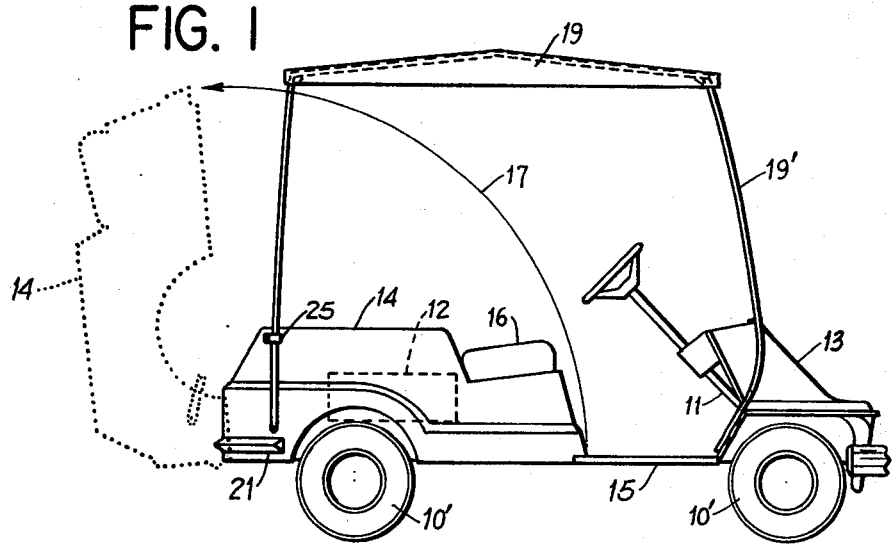
FIG. 1
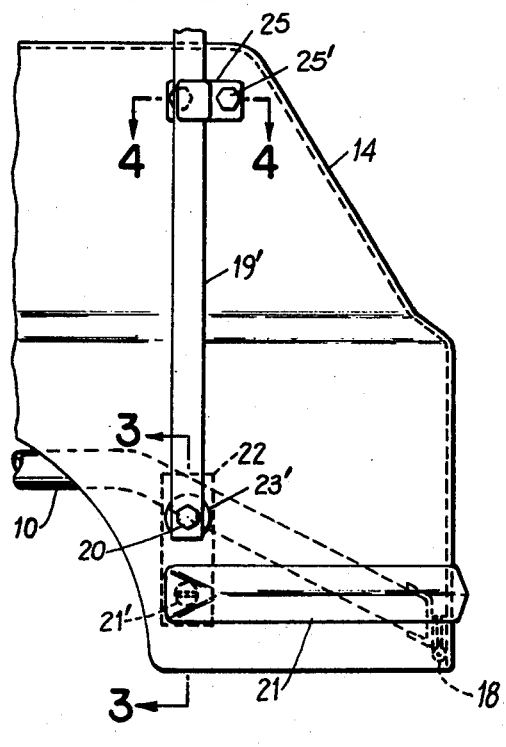
FIG. 2
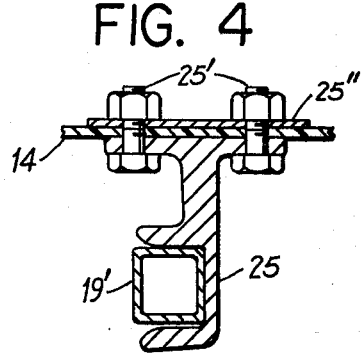
FIG. 4
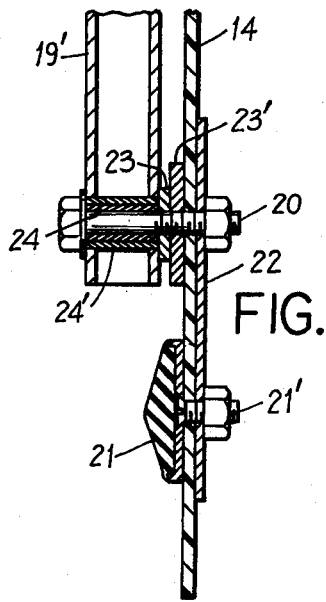
FIG. 3
FIG. 5

GOLF CAR SUNTOP

This invention relates to a golf car suntop, and more particularly, to a low cost suntop for a golf car wherein the rear part of the car body can be hinged open free and clear of the suntop for access to the rear car working parts.

Heretofore, in opening up the car body to gain access to the car working parts, it was necessary to either remove the suntop or the suntop had to be flipped back along with the car body. In the invention both of these disadvantages are overcome in a low cost and uncomplicated manner.

The invention is applicable to either gasoline or electric driven golf cars and is illustrated in the accompanying sheet of drawing wherein FIG. 1 is a side view of the invention;

FIG. 2 is an enlarged view of the rear of the car;

FIG. 3 is an enlarged sectional view taken along the section line 3—3 of FIG. 2;

FIG. 4 is an enlarged sectional view along the section line 4—4 of FIG. 2; and

FIG. 5 is an enlarged perspective view of one corner of the suntop frame.

Referring first to FIG. 1, shown therein is a golf car having a wheeled frame comprising a frame 10 (see FIG. 2) and wheels 10'. Mounted on the front end of the frame is a steering mechanism 11, and mounted at the rear end of the frame is a power means 12, which can be gasoline or electric, for steering and driving the wheeled frame. The car has a body comprising a front portion 13 and a rear portion 14, and an intervening floor board 15. The front body part 13 covers the steering mechanism and other car working parts at the front end of the frame, whereas the rear body part 14 houses the power means 12 and other car working parts at the rear end of the frame. The rear body part 14 includes seat means 16 for passengers and, as is well known in the art, the rear body part 14 is separable with respect to the remainder of the body so that it can be hinged or swung open in a rearward direction to afford access to the power means and other rear end working parts for service and repair. The rear body part 14 is shown in dotted line in FIG. 1 in its approximate vertical hinged open position. The front tip of the rear body part 14 swings along an arc 17 to clear the suntop.

Only the salient parts of the car and rear end of frame 10 have been illustrated, since the golf car per se is conventional. As can be seen from FIG. 2, the rear body part 14 can be hinged open, since its back end is connected by a hinge 18 to the rear end of the car frame 10.

Suntops for golf cars are not new per se; however, in the invention the suntop is so mounted on the car so that the rear body part 14 alone can be swung open without interference from the suntop, or needing to dissassemble or adjust the suntop. In some prior arrangements the suntop is mounted on the car body so that the suntop has to be swung back along with the body. This, of course, has the disadvantage that much more space is required in the service shop.

In the invention the suntop has a canopy 19 and a frame comprising a pair of inverted U-shaped members 19' on opposite sides of the car and upper cross brace members 19''. One corner of the suntop frame is illustrated in FIG. 5. The suntop frame is built up out of elongated hollow tubing so as to be capable of flexing slightly, but without permanent distorsion. The front ends of the U-shaped members 19' are fixed to the front body part 13 and the rear ends are pivoted to the back end of the rear body part 14 by a stud 20 connecting the same thereto. Thus, the rear lower pivoted end of the U-shaped members 19' will move up and rearwardly somewhat from the full line position illustrated in FIG. 1 to the dotted line position when the rear body is hinged open about the hinge 18. However, this degree of change in position for the stud 20 is minor or inconsequential as compared to the flexibility and long lengths of tubing making up the suntop frame parts 19'. That is to say, the suntop frame parts 19' will flex to allow this change in position for the stud 20, and without any permanent distortion in the suntop frame. In other words, the suntop frame will bound back to its full line position when the rear body part 14 is hinged closed.

The invention can be shipped already incorporated into the golf car, or it can be offered as a kit for later installation. As shown in FIGS. 2 and 3, a bumper 21 is provided for the rear end of the body. Bumper 21 is connected to the rear body 14 by studs 21' and other not shown fastenings. In order to properly align or mount the pivot point for the rear end of the suntop to the car body, a plate or strap 22 having two holes is provided. The stud 21' passes through its lower hole and the stud 20 through its upper hole. Its upper hole serves as a guide for drilling a hole in the car body 14 for the stud 20. The car body typically is constructed from fiberglass reinforced molded plastic. Parts 23 and 23' comprise a pair of spacers or washers for spacing the suntop frame tubes from the car body 14, and parts 24 and 24' comprise a pair of bushings on the stud 20 which together with the stud pass through a hole formed in the suntop tubing 19'. The washers and bushings facilitate the relative pivotal movement required between the lower end of the suntop tubing 19' and the rear car body part 14 when the latter is hinged open and closed without wearing the hole formed in the rear car body part 14. Besides serving as an alignment means for the hole in the rear car body part 14 for the stud 20, the strap 22 and the larger washer or spacer 23' also serve as a backing for the drilled car body part 14.

A sort of clip 25 is provided on the rear body part 14 above the pivot point 20 to help steady the rear of the suntop tubing 19'. As shown, the part 25 is U-shaped, the open end of the U-facing the front of the car and so as to embrace the tubing 19'. The part 25 is fixed to the side of the car body by a pair of studs 25' and a reinforcing strap 25''.

It will now be seen that a low cost and uncomplicated suntop is provided for the golf car so that the body can be hinged open while the suntop remains in place. The parts are dimensioned relative to each other so there is no interference between the body part that is to be hinged open and closed and the suntop. The length of the rear car body part 14 and the height of the suntop are correlated with respect to each other so that the front tip or edge of the rear body car part 14 just clears the suntop. That is to say, it does not strike the rear cross brace 19'' of the suntop.

I claim:

1. In a golf car having a suntop, the car having a wheeled frame and steering means at the front end thereof and power means at the back end thereof for steering and driving the same, a body on said frame including a front portion covering said steering means and a separable back portion including generally vertically extending transversely opposite outer sides covering said power means and a floor board therebetween, said separable back portion including seat means for passengers, said suntop being mounted on said body to permit said separable back portion to be swung open in a rearward direction from a horizontal position to an approximate vertical position to afford access to said power means, said suntop comprising a pair of generally inverted U-shaped frame members on opposite sides of said car each of said inverted U-shaped frame members being somewhat longitudinally flexible and including front and rear lower ends, and upper cross brace members interconnecting said inverted U-shaped members, the front ends of said suntop frame members being fixed to said front body portion, the rear of said back body portion being hinged to the rear of said frame, and the back ends of said suntop frame members being pivoted to the opposite outer sides of said back body portion at the rear end thereof and said back body portion having a length relative the height of said suntop whereby said back body portion is adapted to be hinged open in a rearward direction with respect to said frame and suntop without interference with the upper cross brace members of said suntop.

* * * * *